United States Patent

Tong et al.

[11] Patent Number: 5,773,150
[45] Date of Patent: Jun. 30, 1998

[54] POLYMERIC ANTISTATIC COATING FOR CATHODE RAY TUBES

[75] Inventors: Hua-Sou Tong, Arlington Heights, Ill.; Chun-Min Hu, Keelung, Taiwan

[73] Assignee: Chunghwa Picture Tubes, Ltd., Taiwan

[21] Appl. No.: 560,478

[22] Filed: Nov. 17, 1995

[51] Int. Cl.⁶ .................... H01J 29/28; B32B 27/00
[52] U.S. Cl. ............ 428/429; 428/446; 428/447; 428/522; 427/64; 427/68; 427/72; 427/165; 427/167; 427/240; 313/466; 313/478; 313/479
[58] Field of Search .................. 427/372.2, 407.2, 427/387, 389.7, 314, 240, 441, 64, 68, 72, 165, 167; 313/479, 478, 466, 474; 428/429, 446, 447, 332, 411.1, 922, 522

[56] References Cited

U.S. PATENT DOCUMENTS

| | | | |
|---|---|---|---|
| 2,522,531 | 9/1950 | Mochel | 427/109 |
| 2,564,677 | 8/1951 | Davis | 338/308 |
| 2,564,707 | 8/1951 | Mochel | 428/432 |
| 2,564,709 | 8/1951 | Mochel | 338/327 |
| 2,564,710 | 8/1951 | Mochel | 338/327 |
| 2,808,351 | 10/1957 | Colbert et al. | 428/212 |
| 2,833,902 | 5/1958 | Gaiser et al. | 219/547 |
| 2,852,415 | 9/1958 | Colbert et al. | 428/434 |
| 2,919,212 | 12/1959 | Gaiser | 428/432 |
| 3,093,598 | 6/1963 | McMillan et al. | 252/518 |
| 3,252,829 | 5/1966 | Romstadt et al. | 428/189 |
| 3,738,732 | 6/1973 | Ikeda | 359/588 |
| 4,263,335 | 4/1981 | Wagner et al. | 427/483 |
| 4,393,095 | 7/1983 | Greenberg | 65/60.52 |
| 4,463,114 | 7/1984 | Batchunis et al. | 524/157 |
| 4,468,702 | 8/1984 | Jandrell | 358/245 |
| 4,490,227 | 12/1984 | Bitter | 204/192.26 |
| 4,563,612 | 1/1986 | Deal et al. | 313/478 |
| 4,649,126 | 3/1987 | Gaprindashvili et al. | 501/43 |
| 4,650,557 | 3/1987 | Bitter | 204/192.12 |
| 4,785,217 | 11/1988 | Matsuda et al. | 313/479 |
| 4,857,361 | 8/1989 | Bloss et al. | 427/109 |
| 4,945,282 | 7/1990 | Kawamura et al. | 313/479 |
| 4,987,338 | 1/1991 | Itoa et al. | 313/478 |
| 5,051,652 | 9/1991 | Isomura et al. | 313/479 |
| 5,099,171 | 3/1992 | Daiku et al. | 313/479 |
| 5,122,709 | 6/1992 | Kawamura et al. | 313/479 |
| 5,189,337 | 2/1993 | Endo et al. | 313/479 |
| 5,200,667 | 4/1993 | Iwasaki et al. | 313/479 |
| 5,254,904 | 10/1993 | VanDeLeest et al. | 313/479 |
| 5,291,097 | 3/1994 | Kawamura et al. | 313/478 |
| 5,322,540 | 6/1994 | Jacquet et al. | 65/60.2 |
| 5,370,981 | 12/1994 | Krafft et al. | 430/529 |
| 5,372,924 | 12/1994 | Quintens et al. | 430/527 |
| 5,378,404 | 1/1995 | Han et al. | 252/500 |
| 5,382,383 | 1/1995 | Hirai et al. | 252/501.1 |
| 5,387,433 | 2/1995 | Balian et al. | 427/126.3 |
| 5,412,279 | 5/1995 | De Boer | 313/479 |
| 5,443,944 | 8/1995 | Krafft et al. | 430/529 |
| 5,492,762 | 2/1996 | Hirari et al. | 428/447 |
| 5,624,605 | 4/1997 | Cao et al. | 252/500 |

FOREIGN PATENT DOCUMENTS 0585819   8/1993   European Pat. Off. .

OTHER PUBLICATIONS

Chang, Raymond; Chemistry, Mc Graw–Hill Inc. Third Edition, pp. 622–623, 1988.

*Primary Examiner*—Paul J. Thibodeau
*Assistant Examiner*—D. Lawrence Tarazano
*Attorney, Agent, or Firm*—Emrich & Dithmar

[57] ABSTRACT

A high molecular weight, i.e., molecular weight of 90,000–750,000, conductive polymer soluble in both water and alcohol is mixed with a solution of water, alcohol, tetraethoxysilane (TES), and nitric acid ($HNO_3$) to provide an antistatic coating for a glass display panel of a cathode ray tube (CRT) for grounding static charge on the panel. Conductive polymers such as of polyaniline mixed with either polystyrene sulfonic acid or polyacrylic acid in a molecular ratio of 1:1 or 3,4 polyethylenedioxythiophene added to polystyrenesulphonate in a molecular ratio of 1:1 form a conductive complex which when mixed with a solution of water, alcohol, TES and $HNO_3$ provides a coating solution with a resistivity in the range of $10^{7-10^9}$ ohm/cm² on the outer surface of the CRT display panel.

14 Claims, 1 Drawing Sheet

POLYMERIC ANTISTATIC COATING FOR CATHODE RAY TUBES

FIELD OF THE INVENTION

This invention relates generally to video display panels such as in a cathode ray tube (CRT) and is particularly directed to an antistatic coating for dissipating an electrostatic charge on a video display panel.

BACKGROUND OF THE INVENTION

Many video display devices such as of the cathode ray tube (CRT) type employ a high voltage in developing a video image. In a CRT, this high operating voltage may result in the accumulation of a static charge on the CRT's glass display panel. This static charge attracts dust to the viewing surface, thus degrading a video image presented thereon. In addition, contact with the display panel by a viewer may cause a mild electric shock which is uncomfortable and perhaps even dangerous to the viewer. The dielectric nature of the glass display panel contributes to the possibility of the accumulation of a very high static charge thereon particularly when the CRT is turned on or off, which charge may remain on the panel for an extended period.

In an effort to reduce the potential safety hazard and improve video image quality, various prior art approaches have endeavored to minimize the accumulation of static charge on the CRT's display panel. One such prior approach employs a conductive coating composed essentially of a silicate material and a metallic compound in proportions to impart the desired antistatic characteristic without substantially degrading the image-transmitting capability of the coating. One example of this approach is disclosed in U.S. Pat. No. 4,563,612 to Deal et al., issued Jan. 7, 1986. The metallic compound is disclosed as being composed of at least one element selected from the group consisting of platinum, palladium, tin and gold.

Another approach to reducing static charge buildup on the glass display panel of a CRT employs a semi-conductive coating typically including a metal oxide such as tin oxide which is doped with another metal such as antimony. The dopant bridges the energy gap of the metal oxide providing the coating with the appropriate resistivity for dissipating static charge. Examples of a semi-conductive coating for use on the glass display panel of a CRT can be found in U.S. Pat. Nos. 4,954,282 to Kawamura et al.; 5,122,709 to Kawamura et al.; 5,291,097 also to Kawamura et al.; and 5,382,383 to Hirai et al.

Yet another approach to antistatic coatings for CRTs employs a hygroscopic layer such as of silane, water, sulfuric acid and an alcohol mixture. The hygroscopic materials include ions which tend to absorb water vapor rendering the material conductive. Advantages of this approach are low cost and ease of application of the coating to the CRT's display panel. Examples of hygroscopic antistatic CRT display panel coatings can be found in U.S. Pat. Nos. 5,404,073, issued in the names of the present applicants, and 5,204,177 to Sato et al.

Still another approach employs conductive particles such as of tin oxide, tin oxide doped with Sb, F or P, indium oxide, indium oxide doped with Sn or F, and antimony oxide. These conductive particles are mixed with a solution of water and/or organic solvent comprised of particles having a predetermined range of diameters, and a silica polymer having an average degree of polymerization of 1,500–10, 000. The conductivity of the coating is provided by the metallic particles, while the polymerized silica provides the coating with a specified adhesion and surface smoothness as well as durability and transparency. This approach requires not only the conductive metal-based particles employed in prior approaches, but also employs polymerized silica polymers for providing a matrix structure for the conductive particles.

The present invention represents an improvement over the aforementioned prior art approaches by providing a high molecular weight, i.e., molecular weight of 90,000–750,000, conductive polymer soluble in both water and alcohol which does not require a conductive metal component for providing an antistatic coating for the outer surface of a glass display panel of a CRT affording a resistivity in the range of $10^7$–$10^9$ ohm/cm$^2$.

OBJECTS AND SUMMARY OF THE INVENTION

Accordingly, it is an object of the present invention to provide an improved antistatic coating for a video display panel.

It is another object of the present invention to provide an antistatic coating for the outer surface of a glass display panel for dissipating electrostatic charge.

It is yet another object of the present invention to provide an antistatic coating for deposit by either spin coating or spray coating on the outer surface of a glass display panel which is abrasion resistant and has low resistivity.

This invention contemplates a method for providing an antistatic coating on an outer surface of a glass video display panel, the method comprising the steps of: mixing polystyrene sulfonic acid or polyacrylic acid with polyaniline or mixing 3,4 polyethylenedioxythiophene with polystyrene-sulphonate to form a conductive complex having a molecular weight in the range of 90,000–750,000; adding the conductive complex to a mixture of water, alcohol, tetraethoxysilane and $HN0_3$ to form an antistatic coating; and applying the antistatic coating to the outer surface of the glass video display panel in the form of a thin layer.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
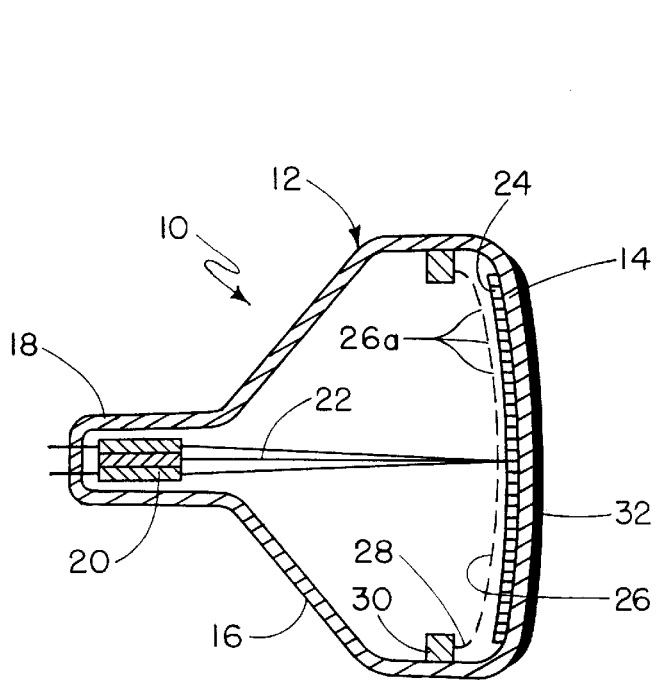
FIG. 1 is a longitudinal sectional view of a CRT incorporating an antistatic coating in accordance with the principles of the present invention.

Referring to FIG. 1, there is shown a longitudinal sectional view of a color CRT 10 incorporating an antistatic coating 32 in accordance with the principles of the present invention. In the following discussion the terms "display screen", "display panel" and "faceplate" are used interchangeably. CRT 10 includes a sealed glass envelope 12 having a forward faceplate or display screen 14, an aft neck portion 18, and an intermediate funnel portion 16. Disposed on the inner surface of glass faceplate 14 is a phosphor screen 24 which includes a plurality of discrete phosphor deposits, or elements, which emit light when an electron beam is incident thereon to produce a video image on the faceplate. Color CRT 10 includes three electron beams 22 directed onto and focused upon the CRT's glass faceplate 14. Disposed in the neck portion 18 of the CRT's glass envelope 12 are a plurality of electron guns 20 typically arranged in an inline array for directing the electron beams 22 onto the phosphor screen 24. The electron beams 22 are deflected vertically and horizontally in unison across the phosphor screen 24 by a magnetic deflection yoke which is not shown in the figure for simplicity. Disposed in a spaced manner from phosphor screen 24 is a shadow mask 26 having a plurality of spaced electron beam passing apertures 26a and a skirt portion 28 around the periphery thereof. The shadow mask skirt portion 28 is securely attached to a shadow mask mounting fixture 30 around the periphery of the shadow mask. The shadow mask mounting fixture 30 is attached to an inner surface of the CRT's glass envelope 12 and may include conventional attachment and positioning structures such as a mask attachment frame and a mounting spring which also are not shown in the figure for simplicity. The shadow mask mounting fixture 30 may be a attached to the inner surface of the CRT's glass envelope 12 and the shadow mask 26 may be attached to the mounting fixture by conventional means such as weldments or a glass-based frit.

Figure 2:
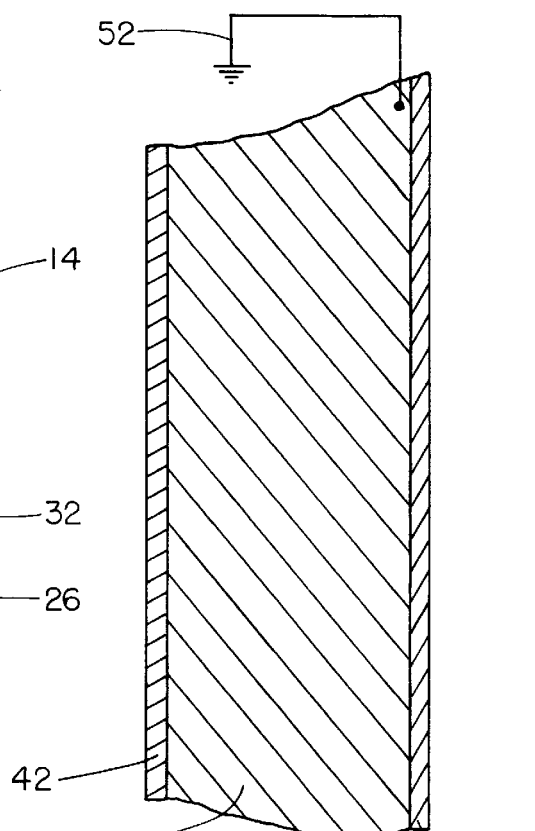
FIG. 2 is a partial sectional view of a flat display panel having an antistatic coating in accordance with the present invention on the outer surface thereof.

Referring to FIG. 2, there is shown a partial sectional view of a portion of a glass display panel, or faceplate, 40 having a phosphor layer 42 on the inner surface thereof and an antistatic coating 44 in accordance with the present invention on the outer surface thereof. The glass display panel 40 is shown in FIG. 2 as being flat, as the present invention is applicable to both curved and flat display screens. In addition, while the present invention has been described thus far in terms of use on the outer surface of the display panel of a CRT, the present invention is not limited to use with this type of display device. For example, the antistatic coating of the present invention may be used equally as well on the outer surface of field emission displays (FEDs), plasma discharge panel (PDPs), vacuum florescent screens, and gas discharge screens. The phosphor layer 42 on the inner surface of the glass display screen 40 may be in the form of a large number of discrete dots or stripes. A conductor 52 may be attached to the outer surface portion of the display screen 40 for connecting the display screen to neutral ground potential.

Figure 3:
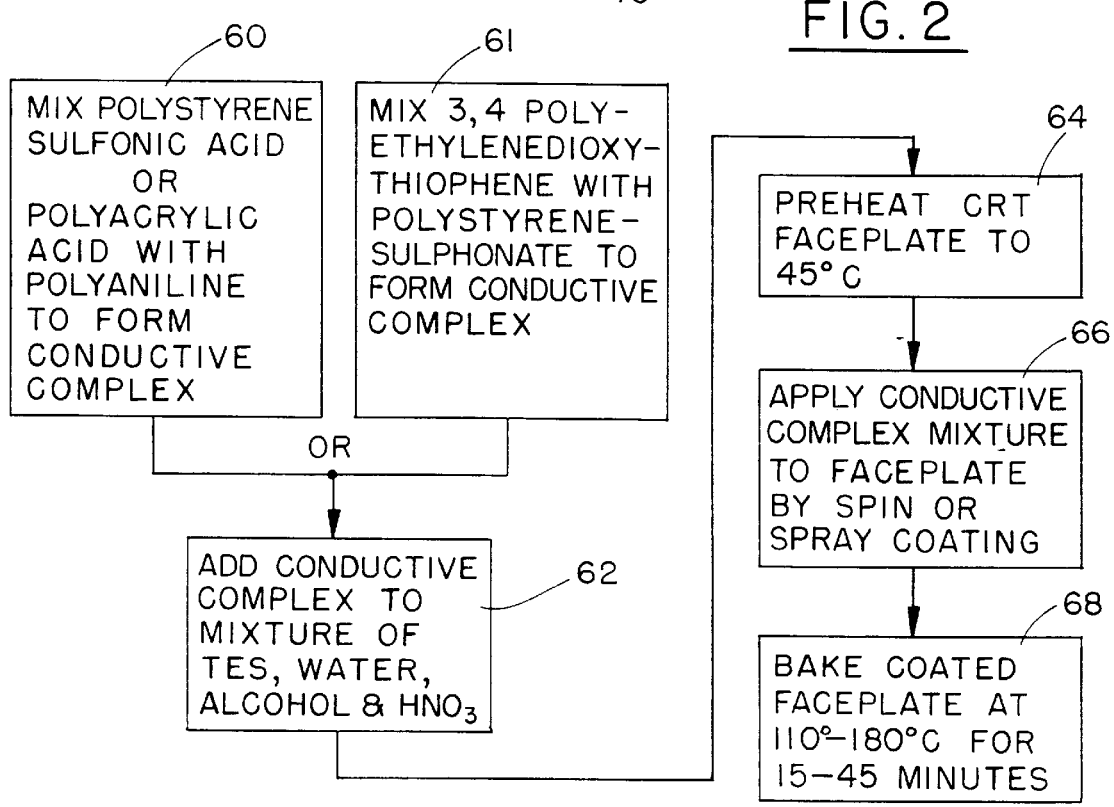
FIG. 3 is a flow chart illustrating the steps involved in preparing and applying an antistatic coating to the outer surface of a glass display panel of a video display device in accordance with the present invention.

Referring to FIG. 3, there is shown a flow chart illustrating in simplified schematic diagram form the steps involved in preparing and applying an antistatic coating to the outer surface of a glass display panel of a video display device in accordance with the principles of the present invention. At step 60, either polystyrene sulfonic acid or polyacrylic acid is mixed with polyaniline in a molecular ratio of 1:1 to form a conductive polymer complex. The polystyrene sulfonic acid or polyacrylic acid and polyaniline are allowed to react so as to form a conductive complex having a molecular weight in the range of 90,000–750,000. In another embodiment, 3,4 polyethylenedioxy-thiophene is mixed with polystyrenesulphonate in a molecular ratio of 1:1 to form a conductive polymer complex at step 61. The 3,4 polyethylenedioxythiophene and polystyrenesulphonate are allowed to react so as to form a conductive complex having a molecular weight in the range of 90,000–750,000. At step 62, the conductive complex is added to a mixture of tetraethoxysilane (TES) (2–12 wt. %), water, alcohol and nitric acid ($HNO_3$) (1.0 wt. %). The conductive complex forms 0.2–6 wt. % of the resulting solution when added to the mixture of the TES, water, alcohol and $HNO_3$. The glass display panel is then preheated to a temperature on the order of 45° C. at step 64.

At step 66, the conductive complex mixture is then applied to the outer surface of the glass display panel by either spin coating or spray coating while the glass display panel is maintained at a temperature on the order of 45° C. The thus coated display panel is then baked at a temperature in the range of 110°–180° C. for 15–45 minutes at step 68. An antistatic coating prepared and applied to the outer surface of a glass display panel as just described employing polystyrene sulfonic acid has been determined to have a resistivity in the range of $10^7$–$10^9$ ohms/cm$^2$. An antistatic coating prepared and applied to the outer surface of a glass display panel as just described employing polyacrylic acid has been determined to have a resistivity in the range of $10^7$–$10^8$ ohms/cm$^2$. The surface hardness of the inventive antistatic coating is such as to be capable of passing a 9H pencil eraser hardness.

There has thus been shown an antistatic coating and a method of preparation and application thereof to the outer surface of a glass display panel of a video display device. The antistatic coating offers a surface resistivity in the range of $10^7$–$10^9$ ohms/cm$^2$ and has successfully passed the 9H pencil eraser hardness test. The antistatic coating is formed by mixing polystyrene sulfonic acid or polyacrylic acid with polyaniline or by mixing 3,4 polyethylenedioxythiophene with polystyrenesulphonate in a molecular ratio of 1:1 to form a conductive polymer complex having a molecular weight in the range of 90,000–750,000 which is soluble in both water and alcohol. The conductive complex is added to a mixture of tetraethoxysilane, water, alcohol, and $HNO_3$ to form the antistatic coating. After preheating the glass display panel, the antistatic coating is applied to the outer surface of the glass display panel in the form of a thin layer by either spin or spray coating.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration on and not as a limitation. The actual scope of the invention is intended to be defined in the following claims when viewed in their proper perspective based on the prior art.

We claim:

1. A video display apparatus comprising:
   a display panel having an outer and an inner surface, wherein said outer surface is in facing relation to a viewer of the video display apparatus; and
   an antistatic coating layer applied to the outer surface of said display panel by either spin or spray coating, said coating layer comprised of a solution of water, alcohol, tetraethoxysilane, nitric acid and an electrically conductive polymer soluble in water and alcohol dissolved in the solution, wherein said conductive polymer and comprises a mixture of polyaniline with either polystyrene sulfonic acid or polyacrylic acid in a molecular ratio of 1:1.

2. The video display apparatus of claim 1 wherein said conductive polymer forms 0.2-6 wt. % of said antistatic coating layer.

3. The video display apparatus of claim 2 wherein said solution is comprised of water, alcohol, 2–12 wt. % tetraethoxysilane, and 1.0 wt. % $HNO_3$.

4. The video display apparatus of claim 1 wherein said conductive polymer is comprised of a mixture of 3,4 polyethylenedioxythiophene and polystyrenesulphonate in a molecular ratio of 1:1.

5. An antistatic coating applied to an outer surface of a glass display panel of a video display device by either spin or spray coating, wherein said outer surface is in facing relation to a viewer of the video display device, said antistatic coating comprising:

a solution of water, alcohol, tetraethoxysilane and nitric acid; and an electrically conductive polymer soluble in water and alcohol dissolved in said solution, said conductive polymer comprises a mixture of polyaniline with either polystyrene sulfonic acid or polyacrylic acid in a molecular ratio of 1:1.

6. The antistatic coating of claim 5 wherein said solution is comprised of water, alcohol, 2-12 wt. % tetraethoxysilane and 1.0 wt. % $HNO_3$.

7. The antistatic coating of claim 6 wherein said conductive polymer is 0.2–6 wt. % of said solution.

8. The antistatic coating of claim 5 wherein said conductive polymer is comprised of a mixture of 3,4 polyethylenedioxythiophene and polystyrenesulphonate in a molecular ratio of 1:1.

9. A method for providing an antistatic coating on an outer surface of a glass video display panel, wherein said outer surface is in facing relation to a viewer of the video display panel, said method comprising the steps of:

mixing polystyrene sulfonic acid or polyacrylic acid with polyaniline to form an electrically conductive complex, wherein said polystyrene sulfonic acid or said polyacrylic acid is mixed with said polyaniline in a molecular ratio of 1:1;

adding said conductive complex to a mixture of water, alcohol, tetraethoxysilane and $HNO_3$ to form an antistatic coating; and applying the antistatic coating to the outer surface of the glass video display panel in the form of a layer by either spin or spray coating.

10. The method of claim 9 further comprising the step of preheating the video display panel to a temperature on the order of 45° C. prior to the step of applying the antistatic coating to the video display panel.

11. The method of claim 10 further comprising the step of baking the video display panel with said antistatic coating on the outer surface thereof at a temperature in the range of 110°–180° C. for 15–45 minutes.

12. The method of claim 9 wherein said conductive complex is added to said mixture so as to form 0.2–6 wt. % of said mixture.

13. The method of claim 12 wherein said mixture is comprised of water, alcohol, 2–12 wt. % tetraethoxysilane, and 1.0 wt. % $HNO_3$.

14. The method of claim 9 wherein the step of applying the antistatic coating includes either spin or spray coating the antistatic coating on the outer surface of the glass display panel.

* * * * *

UNITED STATES PATENT AND TRADEMARK OFFICE
CERTIFICATE OF CORRECTION

PATENT NO. : 5,773,150
DATED : 6/30/98
INVENTOR(S) : HUA-SOU TONG and CHUN-MIN HU It is certified that error appears in the above-indentified patent and that said Letters Patent is hereby corrected as shown below:

| COLUMN | LINE | |
|---|---|---|
| ABSTRACT | 13 | "$10^{7-109}$" should read --$10^7-10^9$--. |
| 4 | 64 | Cancel "and" |
| 4 | 66 | "polyvstvrene" should be -- polystyrene --. |

Signed and Sealed this

Fifteenth Day of September, 1998

BRUCE LEHMAN

Attest:

Attesting Officer

Commissioner of Patents and Trademarks